(12) United States Patent
Humphrey et al.

(10) Patent No.: US 6,626,325 B1
(45) Date of Patent: *Sep. 30, 2003

(54) BLOW MOLDING APPURTENANCES TO A CONTAINER

(75) Inventors: David Humphrey, Alpharetta, GA (US); Keith Barno, Anniston, AL (US); Gary L. Bouc, Beatrice, NE (US)

(73) Assignee: Hoover Materials Handling Group Inc., Beatrice, NE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,020

(22) Filed: Nov. 13, 1998

(51) Int. Cl.[7] .............................................. B65D 25/00
(52) U.S. Cl. ........................ 220/677; 220/4.13; 220/675
(58) Field of Search ................................. 220/562, 563, 220/564, 675, 4.13, 677, 4.14, 4.15

(56) References Cited

U.S. PATENT DOCUMENTS

| | | | | | |
|---|---|---|---|---|---|
| 4,659,531 A | * | 4/1987 | Ezaki | ........................ | 264/515 |
| 4,895,268 A | * | 1/1990 | Hyde | ..................... | 200/675 X |
| 4,927,044 A | * | 5/1990 | Gotoh et al. | ............. | 220/675 X |
| 4,960,376 A | * | 10/1990 | Udell | ..................... | 220/675 X |
| 5,285,923 A | * | 2/1994 | Brandon, Jr. | ............. | 220/562 X |
| 5,850,933 A | * | 12/1998 | Pazik | ..................... | 220/4.14 X |

* cited by examiner

*Primary Examiner*—Steven Pollard
(74) *Attorney, Agent, or Firm*—Wood, Phillips, Katz, Clark & Mortimer

(57) ABSTRACT

A blow molded shipping container includes a hollow bottle of thermoplastic material defined by a continuous outer wall having a parting line formed during blow molding the bottle and a fill opening located on the parting line. An appurtenance of a material different from the thermoplastic material is integrally fused to the bottle during the blow molding of the bottle at a location of the bottle other than the parting line.

14 Claims, 3 Drawing Sheets

BLOW MOLDING APPURTENANCES TO A CONTAINER

FIELD OF THE INVENTION

This application relates to blow molded containers and, more particularly, to blow molding appurtenances to a container.

BACKGROUND OF THE INVENTION

The blow molding process is used to form hollow articles such as containers by expanding a parison extruded sleeve of heat softened plastic under pressure to match an inner contour of a mold. The mold is typically formed of first and second mold halves positioned together to define a mold cavity having a parting line between the mold halves. This process is used to form thin walled hollow products of uniform thickness. A parting line is present in the article formed from the parting line of the mold.

Blow mold tooling, particularly for large shipping containers, is relatively expensive. A significant portion of this cost can be attributed to the necessary appurtenances for the article. The appurtenances were previously limited to the parting line areas of the blow molded part. After a mold has been constructed and there arises a need for additional appurtenances to be added to the article, especially if the desired location is other than the parting line, it is either prohibitively expensive or not possible to add such appurtenances. As the mold halves pull away from each other at their parting line, any appurtenances which are not located at the parting line would capture the part in the mold. Because the mold generally has closely spaced cooling lines, it becomes prohibitively expensive or impossible to install retractable molding features through the ball of the mold, especially if those appurtenances are only to be added temporarily for a customized version of the standard molded part then removed later to again produce the standard part.

The present invention is directed to overcoming one or more of the problems discussed above in a novel and simple manner.

SUMMARY OF THE INVENTION

In accordance with the invention there is provided a blow molded article in which an appurtenance is integrally fused to a container during the blow molding of the container.

Broadly, there is disclosed herein a blow molded article comprising a hollow container of thermoplastic material defined by a continuous outer wall having a parting line formed during blow molding the container. An appurtenance of a material different from the thermoplastic material is integrally fused to the container during the blow molding of the container at a location of the container other than the parting line.

It is a feature of the invention that the appurtenance is heat fusion bonded to the outer wall.

It is another feature of the invention that the appurtenance comprises an injection molded plastic insert.

It is a further feature of the invention that the appurtenance is made of a stronger plastic than the thermoplastic material.

It is yet another feature of the invention that the appurtenance is made of metal.

It is still another feature of the invention that the appurtenance is made of a thermoplastic material.

In accordance with another aspect of the invention, there is disclosed a blow molded shipping container including a hollow bottle of thermoplastic material defined by a continuous outer wall having a parting line formed during blow molding the bottle and a fill opening located on the parting line. An appurtenance of a material different from the thermoplastic material is integrally fused to the bottle during the blow molding of the bottle at a location of the bottle other than the parting line.

It is a feature of the invention that the appurtenance comprises a threaded inlet opening.

It is yet another feature of the invention that the appurtenance comprises a tie down loop.

There is disclosed in accordance with a further aspect of the invention the method of manufacturing a blow molded shipping container comprising the steps of providing a mold having first and second mold halves positioned together to define a mold cavity having a parting line between the mold halves, removably fastening a preformed appurtenance to one of the mold halves at a location other than the parting line, expanding a parison extruded sleeve of heat softened plastic in the mold to conform to the mold cavity and to fuse around the appurtenance to securely heat bond the appurtenance to the plastic to form a shipping container, and removing the shipping container from the mold cavity with the appurtenance being released from the mold half.

It is a feature of the invention that the removably fastening step comprises fastening the appurtenance to the mold half using a magnet.

It is another feature of the invention that the removably fastening step comprises magnetically fastening a threaded holder to the mold half and threading the appurtenance to the threaded holder.

It is another feature of the invention that the removably fastening step comprises removably fastening the appurtenance to the mold half using a removable adhesive.

It is yet another feature of the invention that the removably fastening step comprises frictionally fastening the appurtenance to the mold half.

It is still another feature of the invention that the removably fastening step comprises fastening the appurtenance to the mold half using a releasable fastener.

In accordance with the invention, a pre-shaped insert or a temporary holder with the insert attached to it is temporarily attached to locations in the mold which are not at the parting line. These may be attached by some means such as removable adhesives, magnets, friction clips, etc. which would allow the insert attached to its temporary holder to be attached to the interior mold at any location, including locations away from the parting line of the mold while the parison extruded sleeve of heat softened plastic is expanded in the blow molding process and fused around the insert to securely heat fusion bond the insert to the wall of the blow molded shipping container.

Further features and advantages of the invention will be readily apparent from the specification and from the drawing.

DETAILED DESCRIPTION OF THE INVENTION

Figure 1:
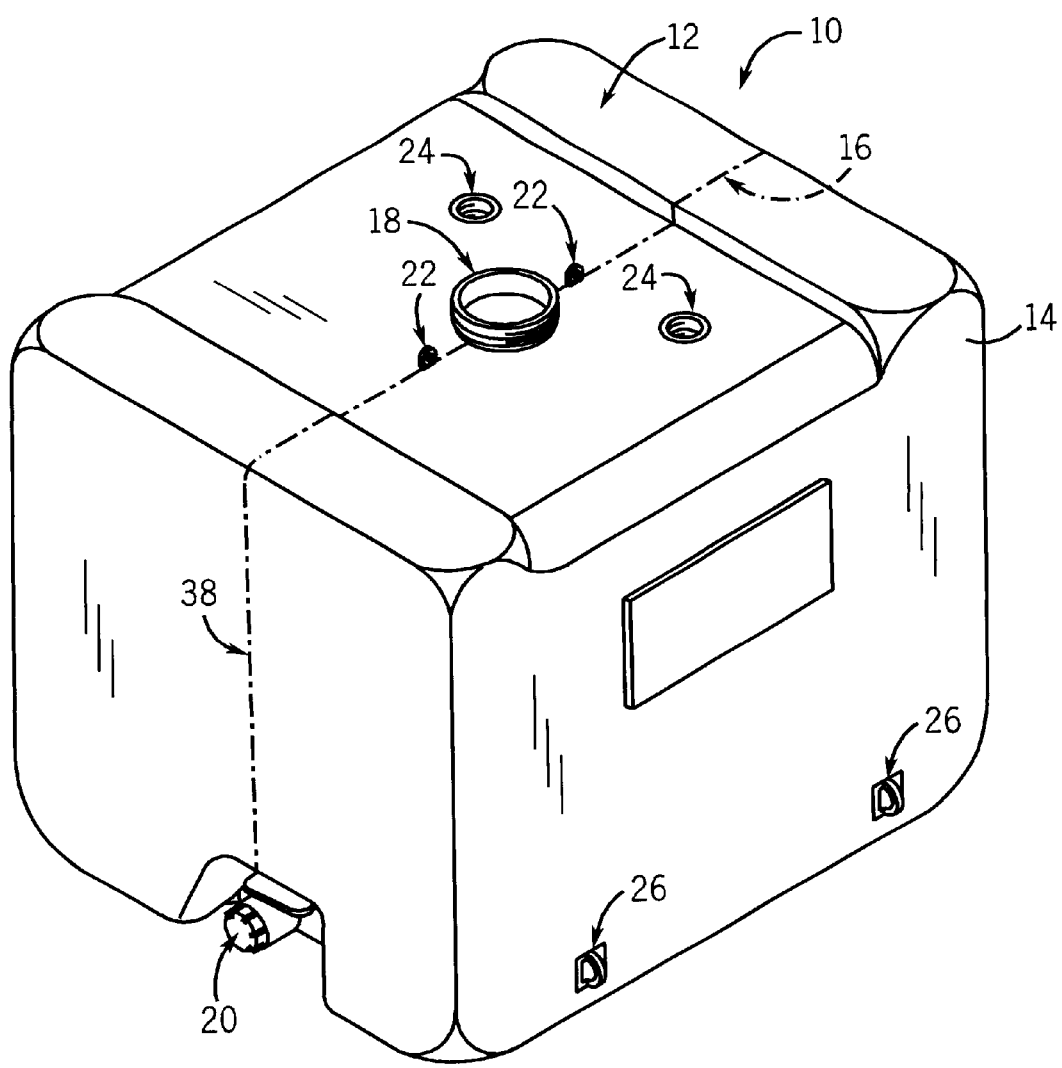
FIG. 1 is a perspective view of a blow molded shipping container formed according to the invention.

Referring to FIG. 1, a blow molded article 10 formed according to the invention is illustrated. In the illustrated embodiment of the invention, the article 10 comprises a shipping container known as an intermediate bulk container (IBC). The container 10 comprises a hollow bottle 12 defined by a continuous, thin outer wall 14 about all six sides in a generally parallelepiped configuration. A parting line 16 is present and is formed during the molding process, as is conventional. A threaded fill opening 18 is located on the parting line 16. Likewise, a pre-shaped discharge valve opening 20 is formed by an insert located also on the parting line 16. Attachment loops 22 are integrally molded to the container 12 at the parting line 16.

Previously, shipping containers 10 as shown used the pre-shaped inserts located only on the parting line 16. In accordance with the invention, appurtenances 24 and 26 are integrally fused to the wall 14 during the blow molding of the bottle 12 at a location other than the parting line 16.

The appurtenances 24 comprises threaded connection bung openings. The appurtenances 26 comprise tie-down loops. Also, the appurtenances might take the form of placard pockets, inlet or outlet valve bodies, or attachments for valves to be attached to. The appurtenances could be pre-made from materials similar to that of the blow molded component, or they could be made of materials with other properties, such as stronger plastics or even metals.

The bottle 12 is manufactured of a thermoplastic such as high density polyethylene. The appurtenances could use the same resin; however, they are typically formed using a different process than blow molding. For example, the bottle 12 may be manufactured using a blow molding grade HDPE while the appurtenances could be made using an injection molded grade HDPE. Also, the appurtenances could be made using a glass filled plastic or stronger plastic. By injection molding the appurtenances, more precision and definition can be provided along with varying thickness and strength. In these respects, the appurtenances are of a material different from the thermoplastic material of the bottle.

Figure 2:
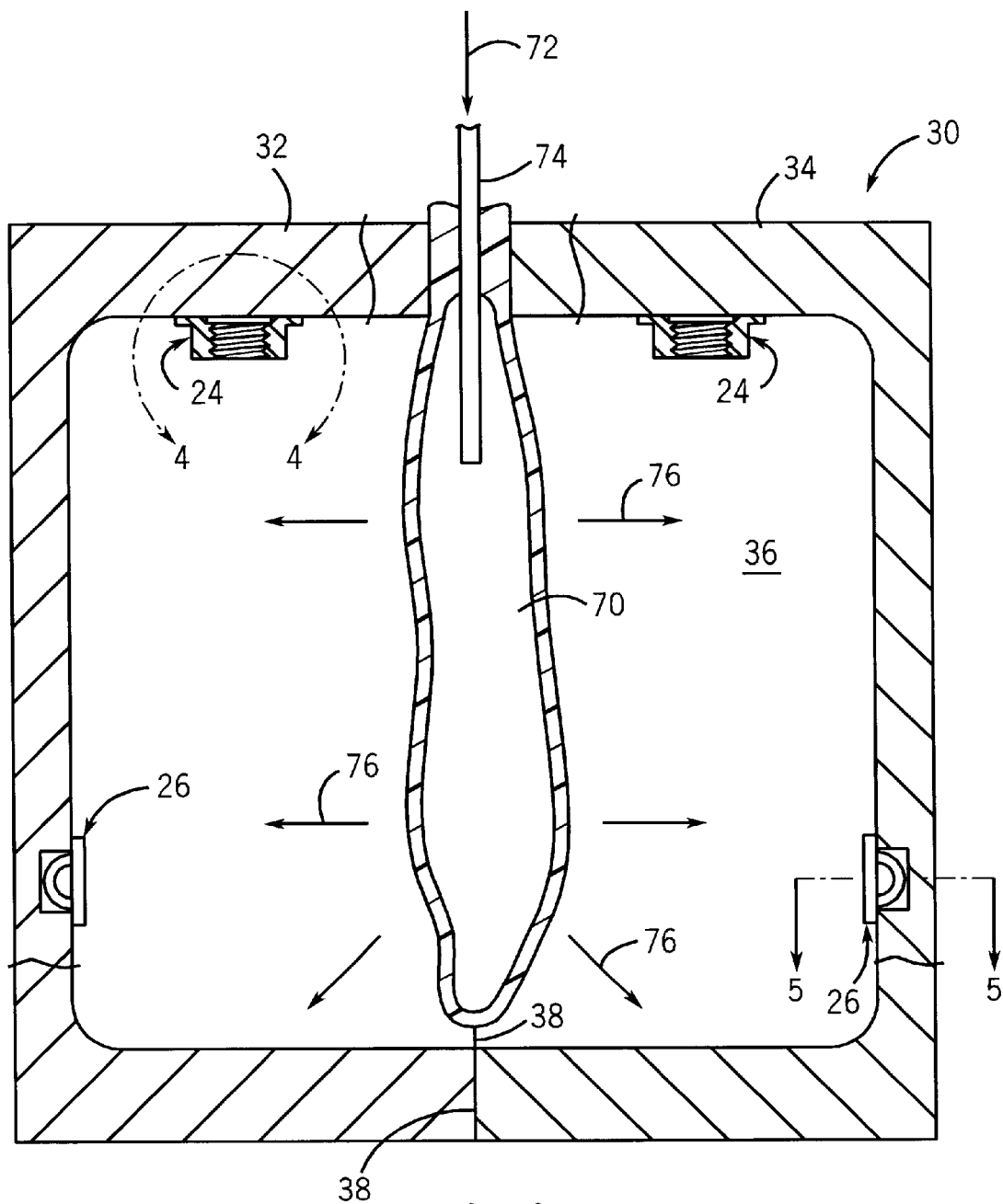
FIG. 2 is a sectional view of a mold used to form the shipping container of FIG. 1 shown during the molding process.

Referring to FIG. 2, a mold 30 is provided for forming the shipping container 10 of FIG. 1. The mold 30 includes a first mold half 32 and a second mold half 34 positioned together to define a mold cavity 36 having a parting line 38 therebetween. The mold 30 is illustrated in generally rectangular form for simplicity. As will be appreciated, the precise form of the mold cavity 36 is dependent on the desired configuration of the article to be molded.

Figure 3:
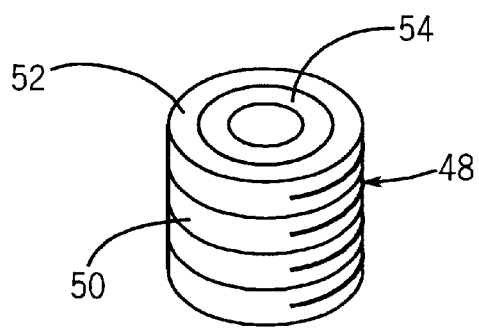
FIG. 3 is a perspective view of a temporary holder used with the mold of FIG. 2.
Figure 4:
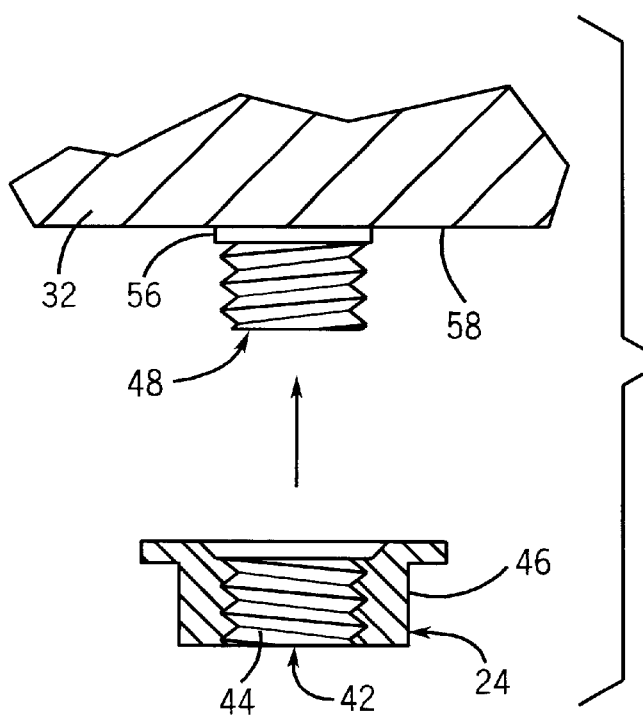
FIG. 4 is a partial sectional view illustrating temporarily removably fastening one type of insert to the mold of FIG. 2.

In accordance with the invention, pre-formed appurtenances are removably fastened to one of the mold halves 32 or 34 at a location other than the parting line 38. Particularly, in the illustrated embodiment of the invention the appurtenances 24 and 26 are removably fastened to the mold halves 32 and 34. The procedure for fastening the appurtenance 24 is particularly illustrated with respect to FIGS. 3 and 4. The appurtenance 24 comprises a pre-formed injection molded threaded bung opening adapter 24. The bung opening adapter 24 comprises a generally cylindrical body 42 having a threaded inner wall 44 conventionally closed by a threaded bung (not shown). An outer wall 46 is appropriately contoured for being fused with the blow molded plastic. A holder 48, particularly illustrated in FIG. 3, is generally cylindrical and has a threaded outer wall 50 to be threadably received in the opening threaded wall 44. An end surface 52 is secured to a magnet 54. The mold halves 32 and 34 are typically made from aluminum. Since magnets are not attracted to aluminum, a steel mounting plate 56 is permanently mounted to an inside wall 58 of the mold half 32, and likewise also 34. The holder 48 is positioned so that it is magnetically fastened to the plate 58. The opening adapter 24 is then threaded onto the holder 48.

Figure 5:
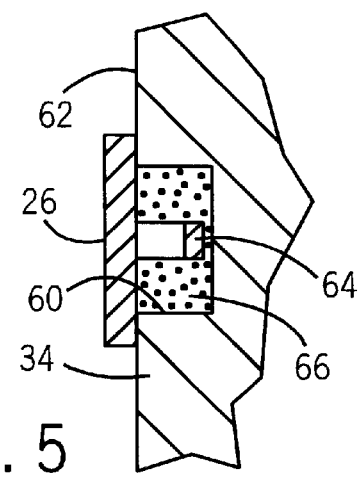
FIG. 5 is a partial sectional view illustrating removably fastening an alternative type appurtenance to the mold of FIG. 2.

Referring to FIG. 5, the mold half 34, and similarly the mold half 32, includes a notch 60 in its side wall 62. A loop 64 of the appurtenances 26 extends into the notch 60 and is removably fastened with a temporary adhesive body 66.

In addition to the attachment means shown, the appurtenances could be frictionally held to the mold halves, held by friction clips, or releasable fasteners such as Velcro®, or snaps. For example, the loop 64 could be frictionally held in a smaller notch in the mold half. In a standard bottle configuration, if the tie-down loops 26 are not required, then the notch 60 can be closed with an appropriate filler block or the like.

With the appurtenances 24 and 26 removably fastened to the mold halves, a parison 70 in the form of an extruded sleeve of heat softened plastic is expanded via air pressure represented by an arrow 72 into a tube 74. The air pressure forces the plastic to expand, as represented by arrows 76, to form to the mold cavity and fuse around the appurtenances 24 and 26 to securely heat fusion bond the appurtenances 24 and 26 to the wall 14, as illustrated in FIG. 1. After cooling, the mold halves are moved apart in the conventional manner, with the appurtenances 24 and 26 being released from the particular mold halves 32 and 34. When the bottle 12 is removed, the magnetic connection between the holder 48 and the mounting plate 56 is overcome. Likewise, the adhesive body 56 is adapted to be releasable so that the tie-down loops 26 are likewise released. Thereafter the holder 48 can be unscrewed from the opening adapters 24, which are fused to the wall 14. Any adhesive remaining on the tie-down loop 26 can be simply cleaned away.

The illustrated method and resulting article results in reduced costs of producing blow molded shipping containers. The container industry has many varied needs for the designs of shipping containers. If a need for a design variation arises after tooling is completed, then modifications by conventional means might be prohibitively expensive. Clearly, a new tool would also be prohibitively expensive. In addition, both alternatives would require extensively long lead times. In accordance with the invention, pre-shaped appurtenances can be added to the mold at a chosen location, even locations other than the parting line, and can be done with little or no modification of the mold itself. It is economically feasible to mold relatively low quantities of customized design blow molded shipping containers which previously may not have been economically feasible.

The present method can be used to blow mold shipping containers and components of composite-type shipping containers. Composite-type shipping containers may have supporting components made by other means and/or from other materials, to reinforce the blow molded component.

We claim:

1. A blow molded article comprising:

A hollow body of thermoplastic material defined by a continuous outer wall having a parting line formed during blow molding the body; and an appurtenance of a material different from the thermoplastic material, the appurtenance being integrally fused to the body during the blow molding of the body at a location of the body other than the parting line, whereby no portion of the parting line contacts the appurtenance.

2. The blow molded article of claim 1 wherein the appurtenance is heat fusion bonded to the outer wall.

3. The blow molded article of claim 1 wherein the appurtenance comprises an injection molded plastic insert.

4. The blow molded article of claim 1 wherein the appurtenance is made of a stronger plastic than the thermoplastic material.

5. The blow molded article of claim 1 wherein the appurtenance is made of metal.

6. The blow molded article of claim 1 wherein the appurtenance is made of a thermoplastic material.

7. A blow molded shipping container comprising:

A hollow body of thermoplastic material defined by a continuous outer wall having a parting line formed during blow molding the bottle and a fill opening located on the parting line; and an appurtenance of a material different from the thermoplastic material, the appurtenance being integrally fused to the bottle between the blow molding of the bottle at a location of the bottle other than the parting line, whereby no portion of the parting line contacts the appurtenance.

8. The blow molded article of claim 7 wherein the appurtenance is heat fusion bonded to the outer wall.

9. The blow molded article of claim 8 wherein the appurtenance is made of a thermoplastic material.

10. The blow molded article of claim 7 wherein the appurtenance comprises an injection molded plastic insert.

11. The blow molded article of claim 7 wherein the appurtenance is made of a stronger plastic than the thermoplastic material.

12. The blow molded article of claim 7 wherein the appurtenance is made of metal.

13. The blow molded article of claim 7 wherein the appurtenance comprises a threaded inlet opening.

14. The blow molded article of claim 7 wherein the appurtenance comprises a tie-down loop.

* * * * *